United States Patent
Park et al.

[11] Patent Number: 6,042,671
[45] Date of Patent: Mar. 28, 2000

[54] MEMBERS HAVING IMPROVED ADHESION AND SEALING PERFORMANCE FOR ROCKET NOZZLE AND FABRICATION METHOD THEREOF

[75] Inventors: Byeong-Yeol Park; Byung-Hahn Yeh; Sang-Ki Chung; Yun-Chul Kim; Bal Jung, all of Daejon, Rep. of Korea

[73] Assignee: Agency for Defense Development, Daejon, Rep. of Korea

[21] Appl. No.: 09/098,722

[22] Filed: Jun. 17, 1998

[30] Foreign Application Priority Data

Jun. 20, 1997 [KR]  Rep. of Korea ............... 97/26246

[51] Int. Cl.$^7$ ............... B32B 9/00; B32B 31/26
[52] U.S. Cl. ............... 156/172; 156/169; 156/307.1; 156/309.6; 156/330
[58] Field of Search ............... 156/169, 172, 156/307.1, 309.6, 330

[56] References Cited

U.S. PATENT DOCUMENTS

| | | | |
|---|---|---|---|
| Re. 29,375 | 8/1977 | Thiele | 138/141 |
| 4,182,495 | 1/1980 | Borgmeier et al. | |
| 5,264,059 | 11/1993 | Jacarruso et al. | 156/148 |
| 5,643,390 | 7/1997 | Don et al. | 156/307.1 |

OTHER PUBLICATIONS

A.J. Smiley and A. Halbritter, "Dual Polymer Bonding of Thermoplastic Composite Structure", vol. 31, No. 7 (1991) pp. 526–532.

*Primary Examiner*—Sam Chuan Yao
*Attorney, Agent, or Firm*—Scully, Scott, Murphy & Presser

[57] ABSTRACT

Members for a rocket nozzle and a fabrication method thereof, wherein members for a rocket nozzle stacked in order of: a heat-resistant element; a first adhesive which is a thermosetting room temperature-hardening epoxy resin; a second adhesive which is a thermoplastic resin; a third adhesive which is a thermosetting medium temperature-hardening epoxy resin; and a structural body. The fabrication method according to the present invention comprises stacking a first adhesive, which is a thermosetting room temperature-hardening epoxy resin, on a surface of a heat-resistant element; stacking a second adhesive, which is a thermoplastic resin, on the first adhesive; stacking a third adhesive which is a thermosetting medium temperature-hardening epoxy resin, on the second adhesive and thereafter performing a vacuum shaping process; and stacking a structural body on the third adhesive and thereafter hardening the members.

4 Claims, 3 Drawing Sheets

MEMBERS HAVING IMPROVED ADHESION AND SEALING PERFORMANCE FOR ROCKET NOZZLE AND FABRICATION METHOD THEREOF

BACKGROUND OF THE INVENTION

1. Field of the Invention

The present invention relates to members for a rocket nozzle, and in particular to improved members and a fabrication method thereof for the rocket nozzle, capable of burning a propellant in a rocket propelling engine and jetting a gas of high temperature and pressure, thereby obtaining a thrust.

2. Description of the Conventional Art

Generally, as shown in FIG. 1, conventional members for a nozzle used for a rocket nozzle are formed of a heat-resistant element 5, a single-layered adhesive 6, and a composites structural body 1. To adhere the heat-resistant element 5 to the composites structural body 1, the single-layered adhesive 6 is stacked on the heat-resistant element 5, the composites structural body 1 is stacked on an outer surface of the single-layered adhesive 6 by a wet filament winding process, and the single-layered adhesive 6 and the composites structural body 1 are simultaneously formed by an oven-hardening, whereby such members can be obtained. However, in the conventional method, since there is a wide difference of a coefficient of thermal expansion between the heat-resistant element 5 and the composites structural body 1, the single layered adhesive 6 has an extreme residual stress. Therefore, the nozzle fabricated by simultaneously curing the single layered adhesive 6 and the composites structural body 1 in the oven may run a risk of separation of the heat-resistant element 5 and the composites structural body 1 caused by a loosening of the adhesive due to the residual stress on the single layered adhesive 6 when the inside of the heat-resistant element 5 of a nozzle extension part is exposed to a gas of high temperature, when a propellant is burned. A phenol resin is used as a base member, and a carbon fiber or a glass fiber is used to reinforce as members for the heat-resistant element 5 of the nozzle extension part. However, due to its specific properties, the phenol resin may produce pores and minute cracks inside the nozzle extension part after fabrication. And, as described above, a non-adhesion might exist between the heat-resistant element 5 of the nozzle extension part and the composites structural body 1 caused by the residual stress on the single layered adhesive 6 caused by the difference of the coefficient of thermal expansion between the heat-resistant element 5 and the composites structural body 1. If the pores, the minute cracks, or the non-adhesion exists therein, a high temperature gas will penetrate therein to via a defective route inside the heat-resistant element 5, thereby breaking the nozzle extension part.

SUMMARY OF THE INVENTION

Accordingly, it is an object of the present invention to provide an improved rocket nozzle capable of overcoming defects of the conventional rocket nozzle.

To achieve the above objects, there is provided members which have an adhesion as well as sealing capabilities by stacking adhesives with several layers between a nozzle extension part heat-resistant element and a composites structural body, thereby improving reliability of the nozzle.

Additional advantages, objects and features of the invention will become more apparent from the description which follows.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
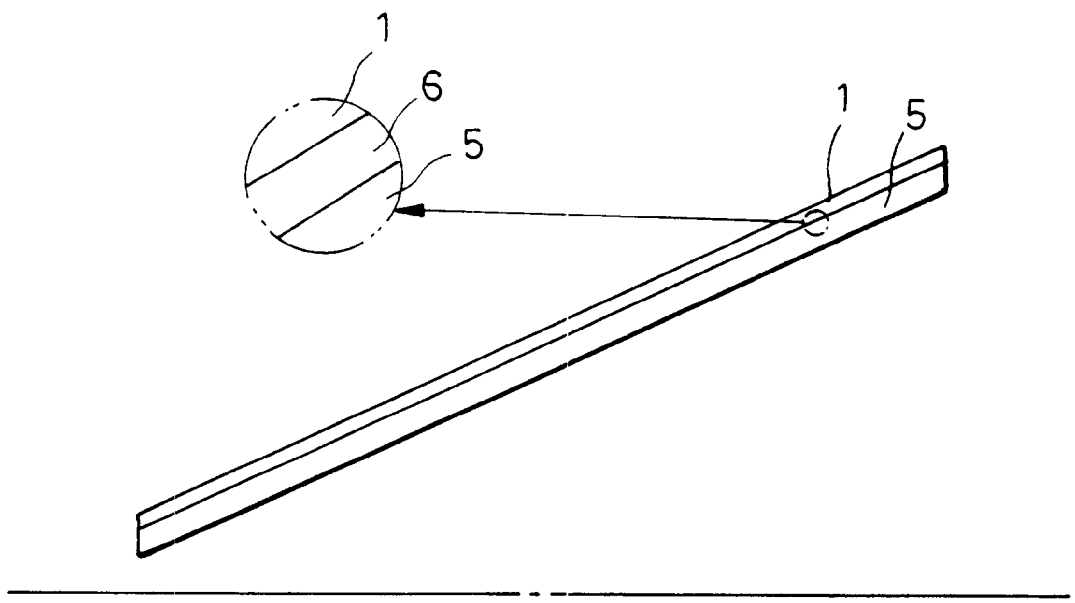
FIG. 1 is a diagram illustrating a single adhered layer between a heat-resistant element of a nozzle extension part and a nozzle composites structural body according to the conventional art.
Figure 2:
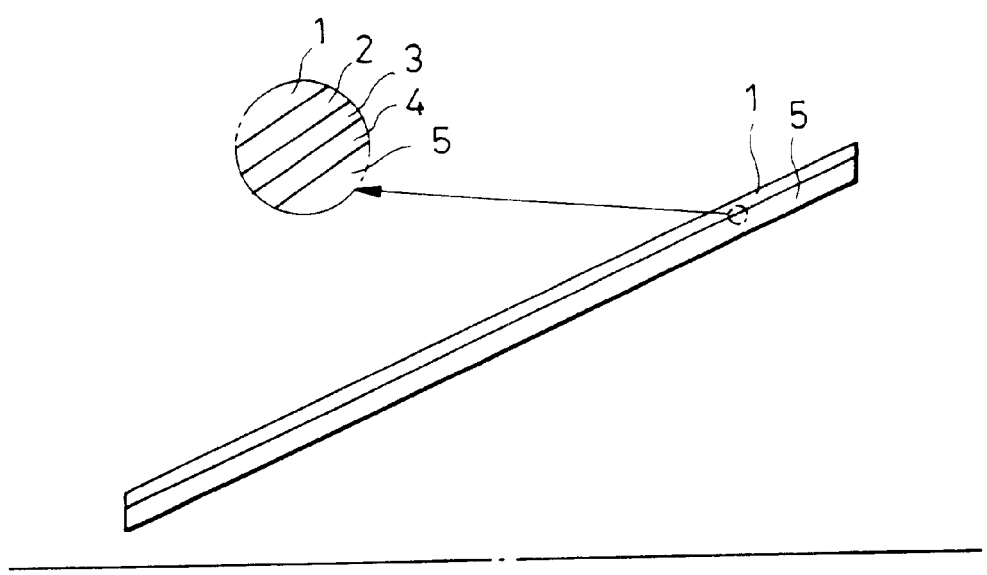
FIG. 2 is a diagram illustrating a plurality of layered adhesives between a heat-resistant element of a nozzle extension part and a nozzle composites structural body according to the present invention.

As shown in FIG. 2, a rocket nozzle according to the present invention comprises a thermosetting adhesive which has a strong adhesion to other members but a low elongation fracturing point and a thermoplastic adhesive which has an excellent gas sealing properties and a high elongation fracturing point but a weak adhesion to other members, which are stacked with each other between a nozzle extension part heat-resistant element 5 and a composites structural body 1.

The fabrication method of the rocket nozzle according to the present invention will now be described in detail. A first adhesive epoxy resin 4 is applied thinly as possible on an outer surface of the nozzle extension part heat-resistant element 5, and then a second adhesive epoxy resin 3 and a third adhesive epoxy resin 2 are stacked, respectively. A release cloth coated with Tetoron, for example, BLEEDER RELEASE manufactured by Airtech International Inc. and a vacuum film, for example, WIGHTCASR 7500R manufactured by Airtech International Inc. are placed over the third adhesive 2, and the vacuum film is connected to a vacuum valve. The connected vacuum film and vacuum valve are vacuum molded in an oven for 10 minutes at 100° C., and the release cloth and the vacuum film are removed. Next, a composites structural body 1 is placed on an outer surface of the structure of the first, second, and third adhesive epoxies 4,3,2 by a wet filament winding process and then the resultant members are cured in the oven, whereby the members of the rocket nozzle according to the present invention can be obtained.

When the release cloth is placed on a surface of the third adhesive epoxy resin 2 and vacuum molded, air in the vacuum film may be eliminated by the vacuum valve through a matrix of the release cloth, and since the release cloth has its own tackiness, it can not be easily removed from the members after it is formed in a vacuum.

And, since an inner part of the vacuum film is sealed with the outside by the vacuum film, and thereby maintaining a vacuum during the vacuuming process, the inner part of the vacuum film is pressurized by the external atmospheric pressure.

Although the condition of the vacuuming process is not particularly limited, the inner part of the vacuum film is maintained at approximately 700 mmHg, and the outer part thereof is maintained at atmospheric pressure.

The wet filament winding process, which is generally used in the field to which the present invention belongs, means the process wherein a fiber is stacked while an epoxy resin is being impregnated therein to.

And, in this specification, the oven-curing means that the members are cured only by heat and without pressure or a vacuum.

A thermosetting room temperature epoxy resin is used as the first adhesive 4, for example, AW-106, HV 953U manufactured by Ciba-Geigy Corporation.

The first adhesive epoxy resin 4 is completely cured in a vacuum and thereby has a strong adhesion to the nozzle extension part heat-resistant element 5 and to the second adhesive epoxy resin 3 by vacuum pressure, whereby the nozzle extension part heat-resistant element 5 and the second adhesive epoxy resin 3 can be easily and tightly adhered to each other. As described above, by using the first adhesive epoxy resin 4 as an agent, a defect of the second adhesive epoxy resin 3, a weak adhesion to the cured member, such as the nozzle extension part heat-resistant element 5, can be complemented.

A thermoplastic epoxy resin with a melting point of about 100–120° C. is used as the second adhesive 3, for example, TBF-615 manufactured by 3M Corporation. The second adhesive 3 has a high elongation fracturing point, thereby being capable of buffing a large residual stress and a thermal expansion difference due to a wide difference of the coefficient of thermal expansion between the nozzle extension part heat-resistant element 5 and the composites structural body 1, whereby separation of the nozzle extension part heat-resistant element 5 and the composites structural body 1 can be prevented. And, the second adhesive epoxy resin 3 has an excellent quality of preventing gas permeation. Accordingly, even though a gas permeation route is formed due to a defect of the nozzle extension part heat-resistant element 5, gas permeation through the nozzle extension part heat-resistant element 5 can be prevented, whereby the nozzle acts a sealant, since the second adhesive 3 which has an excellent adhesion is applied on the outer surface of the nozzle extension part heat-resistant element 5.

Since the thermoplastic epoxy resin is the second adhesive epoxy resin 3, thereby having no adhesive properties in itself, it is not easy to place the adhesive to a form the nozzle extension part heat-resistant element 5. However, if the first adhesive epoxy resin 4 is thinly applied on the outer surface of the nozzle extension part heat-resistant element 5 and the second adhesive epoxy resin 3 is placed thereon, it is easy to place the second adhesive 3 on the surface of the nozzle extension part heat-resistant element 5.

A thermosetting medium temperature epoxy resin is used as the third adhesive epoxy resin 2, for example, FM-73 manufactured by Cynamid Corporation, and the third adhesive epoxy resin 2 maintains a uncured state after the vacuuming progress.

If the vacuuming progress is performed after the above adhesive epoxies 4,3,2 are stacked with plural layers according to the present invention, the three-layered adhesive epoxies stacked on the surface of the nozzle extension part heat-resistant element 5 have a strong adhesion acting as a single unit.

And, since the melting point of the second adhesive epoxy resin 3 is approximately 100° C., the second adhesive epoxy resin 3 has an excellent adhesion in a boundary surface thereof due to the mutual diffusion of the uncured first and third adhesive epoxies 4,2 under the condition of the achieved processing temperature and vacuum pressure.

The oven-curing is performed, after the composites structural body 1 is adhered to an outer surface of the third adhesive epoxy resin 2 by the wet filament winding process wherein the carbon fiber/epoxy resin is used. Since the third adhesive epoxy resin 2 and the epoxy resin which is used for the wet filament winding process are both an uncured epoxy resin state before the oven-curing is carried out, the third adhesive epoxy resin 2 mutually diffuses with each other during the oven-curing. Accordingly, the third adhesive epoxy resin 2 and the composites structural body 1 have a strong adhesion even after the oven-curing which is not able to pressurize the adhered boundary surface thereof.

The oven-curing can be performed on the condition which is generally performed in this field, for example, it can be carried out for 4 hours at 100–120° C.

EXAMPLE—ABOVEGROUND COMBUSTION EXPERIMENT

Figure 3:
FIG. 3 is a photograph of the nozzle extension part according to the present invention, taken by a scanning electron microscope after an aboveground combustion experiment.

FIG. 3 shows the nozzle extension part according to the present invention taken by a scanning electron microscope after an aboveground combustion experiment is carried out at 3000° C. The left side of the photograph shows the composites structural body 1 and the right side shows the nozzle extension part heat-resistant element 5. Accordingly, the middle part is the adhesive layers provided with the third, second, and first adhesive epoxies 2,3,4. As shown in the photograph, there is no non-adhered part between the composites structural body 1 and the heat-resistant element 5, whereby separation thereof can be prevented. Also, the first, second, and third adhesive epoxies 2,3,4 are tightly cohered such that it is hard to distinguish one another.

As described above, the stacked adhesives with several layers according to the present invention is applied to adhering the nozzle extension part heat-resistant element 5 and the composites structural body 1, thereby obtaining an excellent adhesion and sealing between the nozzle extension part heat-resistant element 5 and the composites structural body 1.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. Members for a rocket nozzle stacked in order of: a heat-resistant element; a first adhesive which is a thermosetting room temperature-hardening epoxy resin; a second adhesive which is a thermoplastic epoxy resin; a third adhesive which is a thermosetting medium temperature-hardening epoxy resin; and a structural body.

2. A fabrication method of the members for the rocket nozzle, comprising:

stacking a first adhesive, which is a thermosetting room temperature-hardening epoxy resin, on a surface of a heat-resistant element;

stacking a second adhesive, which is a thermoplastic epoxy resin, on the first adhesive;

stacking a third adhesive which is a thermosetting medium temperature-hardening epoxy resin, on the second adhesive and thereafter performing a vacuum shaping process; and stacking a structural body on the third adhesive and thereafter hardening the members.

3. The method of claim 2, wherein the structural body is stacked on the third adhesive by a wet filament winding process.

4. The method of claim 2, wherein the hardening after the structural body is performed by an oven-hardening.

* * * * *